United States Patent
Pei et al.

(10) Patent No.: US 12,148,047 B2
(45) Date of Patent: Nov. 19, 2024

(54) PERSONALIZED TRANSACTION CATEGORIZATION

(71) Applicant: Intuit Inc., Mountain View, CA (US)

(72) Inventors: Lei Pei, Sunnyvale, CA (US); Juan Liu, Cupertino, CA (US); Ying Sun, Foster City, CA (US); Nhung Ho, Redwood City, CA (US)

(73) Assignee: Intuit Inc., Mountain View, CA (US)

( * ) Notice: Subject to any disclaimer, the term of this patent is extended or adjusted under 35 U.S.C. 154(b) by 109 days.

(21) Appl. No.: 17/187,660

(22) Filed: Feb. 26, 2021

(65) Prior Publication Data

US 2022/0277399 A1      Sep. 1, 2022

(51) Int. Cl.
*G06Q 40/12* (2023.01)
*G06N 5/04* (2023.01)
*G06N 20/00* (2019.01)

(52) U.S. Cl.
CPC .............. *G06Q 40/12* (2013.12); *G06N 5/04* (2013.01); *G06N 20/00* (2019.01)

(58) Field of Classification Search
CPC ........... G06Q 40/12; G06N 5/04; G06N 20/00
See application file for complete search history.

(56) References Cited

U.S. PATENT DOCUMENTS

2018/0300608 A1*  10/2018  Sevrens ............... G06N 3/084
2020/0342012 A1*  10/2020  Weiss .................. G06Q 40/12
2021/0233101 A1*  7/2021   Laserson ............. G06N 20/00
2021/0406734 A1*  12/2021  Pont ..................... G06N 3/08
2022/0092408 A1*  3/2022   Khaitan ............... G06F 13/28

OTHER PUBLICATIONS

Ning, Y., et al., "A Gradient-based Adaptice Learning Framework for Efficient Personal Recommendation", Aug. 27-31, 2017, 9 pages.
Chen, M. X., et al., "Gmail Smart Compose: Real-Time Assisted Writing", May 17, 2019, 9 pages.
Mazare, P., et al., "Training Millions of Personalized Dialogue Agents", Sep. 6, 2018, 5 pages

* cited by examiner

*Primary Examiner* — Peter Ludwig
*Assistant Examiner* — Reva R Moore
(74) *Attorney, Agent, or Firm* — Lathrop GPM LLP (57) ABSTRACT

A method performs personalized transaction categorization. A transaction record is received, by a server application. In a first stage, sparse raw features are extracted from a transaction record of a transaction and converted into a transaction vector including dense features. In a second stage, the transaction vector is classified into a customized chart of accounts using the dense features to generate adapter model output. The method further includes selecting, an account identifier, corresponding to the transaction record and to an account of the customized chart of accounts, using the adapter model output, and presenting the account identifier for the transaction record.

10 Claims, 8 Drawing Sheets

PERSONALIZED TRANSACTION CATEGORIZATION

BACKGROUND

Transaction categorization is often an important part of transaction processing. During transaction categorization, transactions are categorized into different accounts in a chart of accounts. The chart of accounts includes multiple financial accounting accounts that are used in generating financial reports and understanding an entities' finances. In order to properly assess the entity's finances, transactions should be accurately categorized.

Because of the number of transactions, computer systems assist by performing automated transaction categorization. In a computer, automated transaction categorization methods enhance user experience by reducing the need for tedious manual transaction review and categorization. A challenge exists when an entities' chart of accounts has a customized collection of accounts. Because of the customizations, computers have difficulty categorizing the account.

SUMMARY

In general, in one or more aspects, the disclosure relates to a method that performs personalized transaction categorization. In a first stage, sparse raw features are extracted from a transaction record of a transaction and converted into a transaction vector including dense features. In a second stage, the transaction vector is classified into a customized chart of accounts using the dense features to generate adapter model output. The method further includes selecting, an account identifier, corresponding to the transaction record and to an account of the customized chart of accounts, using the adapter model output, and presenting the account identifier for the transaction record.

In general, in one or more aspects, the disclosure relates to a system that includes a server comprising one or more processors and one or more memories, and a server application, executing on one or more processors of the server. A transaction record is received by the server application. A transaction vector is generated from the transaction record using a transaction model. An adapter model output is generated from the transaction vector using an adapter model customized to a plurality of accounts. An account identifier, corresponding to the transaction record and to an account of the plurality of accounts, is selected, by the server application, using the adapter model output. The account identifier is presented for the transaction record.

In general, in one or more aspects, the disclosure relates to a method that trains machine learning models for personalized transaction categorization. An adapter model is trained to generate adapter model outputs from transaction vectors using an update function of the adapter model. A transaction vector is generated from a transaction record using a transaction model. An adapter model output is generated from the transaction vector using an adapter model customized to a plurality of accounts. An account identifier, corresponding to the transaction record and to an account of the plurality of accounts, is selected, by a server application, using the adapter model output.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

One or more embodiments are directed to computer classification of transactions into a chart of accounts for established entities that use an application. Established entities are entities that have used an application for a period of time such that the established entities have a customized chart of accounts. Established entities often have complex charts of accounts, which may contain multiple accounts that do not match with the accounts of other entities. Thus, to accommodate the level of customization, standard machine learning categorization techniques may be insufficient because such techniques rely on having significant training data (i.e., enough transactions that are known correctly categorized in the customized chart of accounts). With a customized chart of accounts only for a single entity, the number of transactions that are known to be correctly categorized is insufficient.

Stated another way, for a particular entity, limited training data is available compared to the amount of data required to train a machine learning model. Training the machine learning model involves adjusting parameters of the model using training samples (i.e., pre-categorized transaction records). In the case of a single entity with a customized chart of accounts, the number of parameters of the model may be significantly greater than the training samples. Because of this imbalance, a single machine learning model that categorizes transactions into accounts cannot be trained with just the entity's data.

One or more embodiments are directed to a two-stage solution to this problem. The first stage includes a transaction model that encodes transaction records into a transaction vector. Because transaction records are standardized (e.g., have the same type of data regardless of the entity), the first stage is a general model that may be used across multiple entities. The second stage includes an adapter model. The adapter model is customized to the particular entity and the particular entity's chart of accounts. The adapter model uses, as input, the transaction vector and generates, as output, an account in the customized chart of accounts. The two-stage solution addresses the problem because the first stage, which can be trained using training data from a variety of entities, reduces the number of features needed to be considered by the second stage. By reducing the number of features, the second stage can be trained for the particular entity using the limited training data that is available for that particular entity. One or more embodiments may include additional stages without departing from the scope of the disclosure.

Figure 1A:
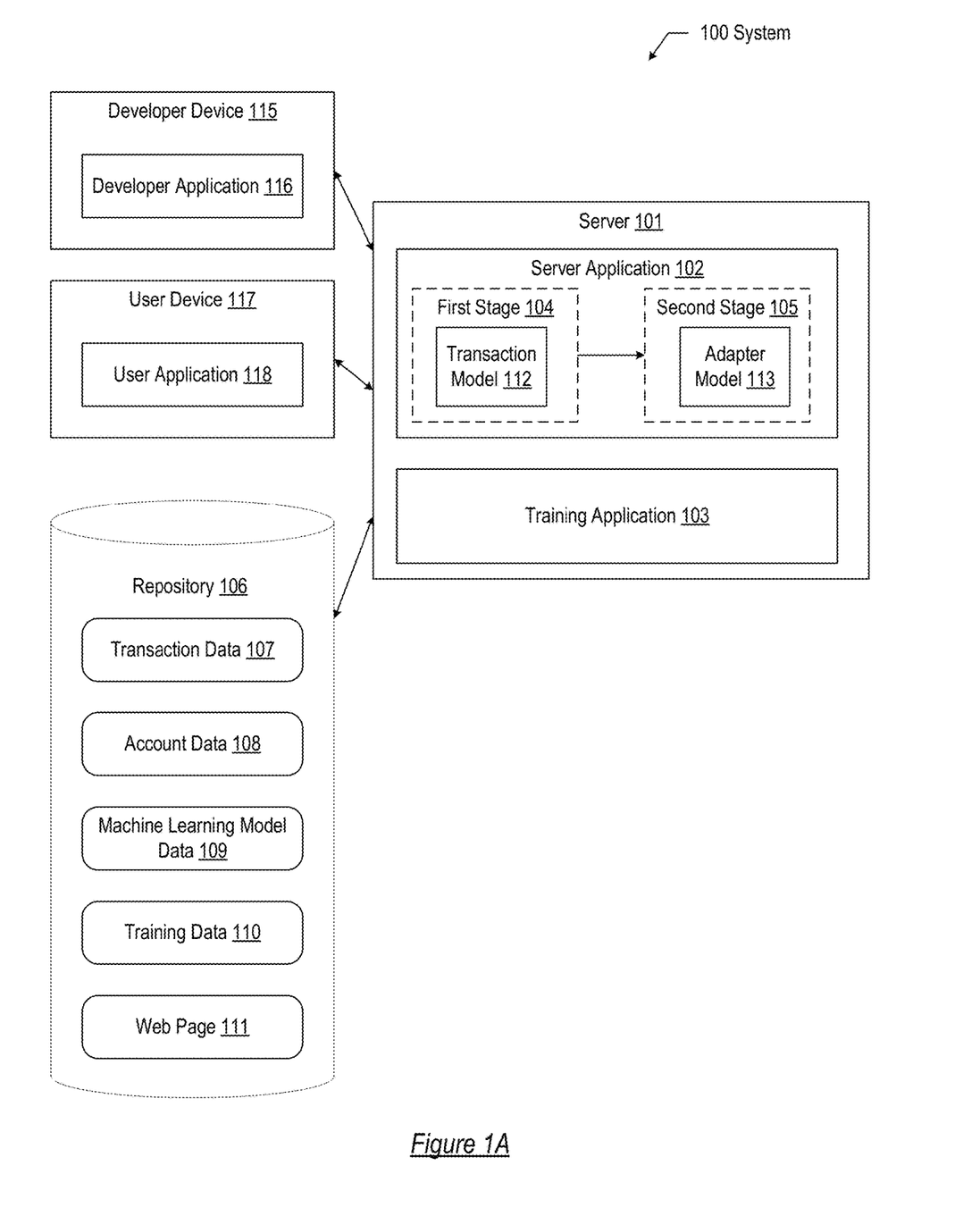
FIG. 1A, FIG. 1B, and FIG. 1C show diagrams of systems in accordance with disclosed embodiments.
Figure 1B:
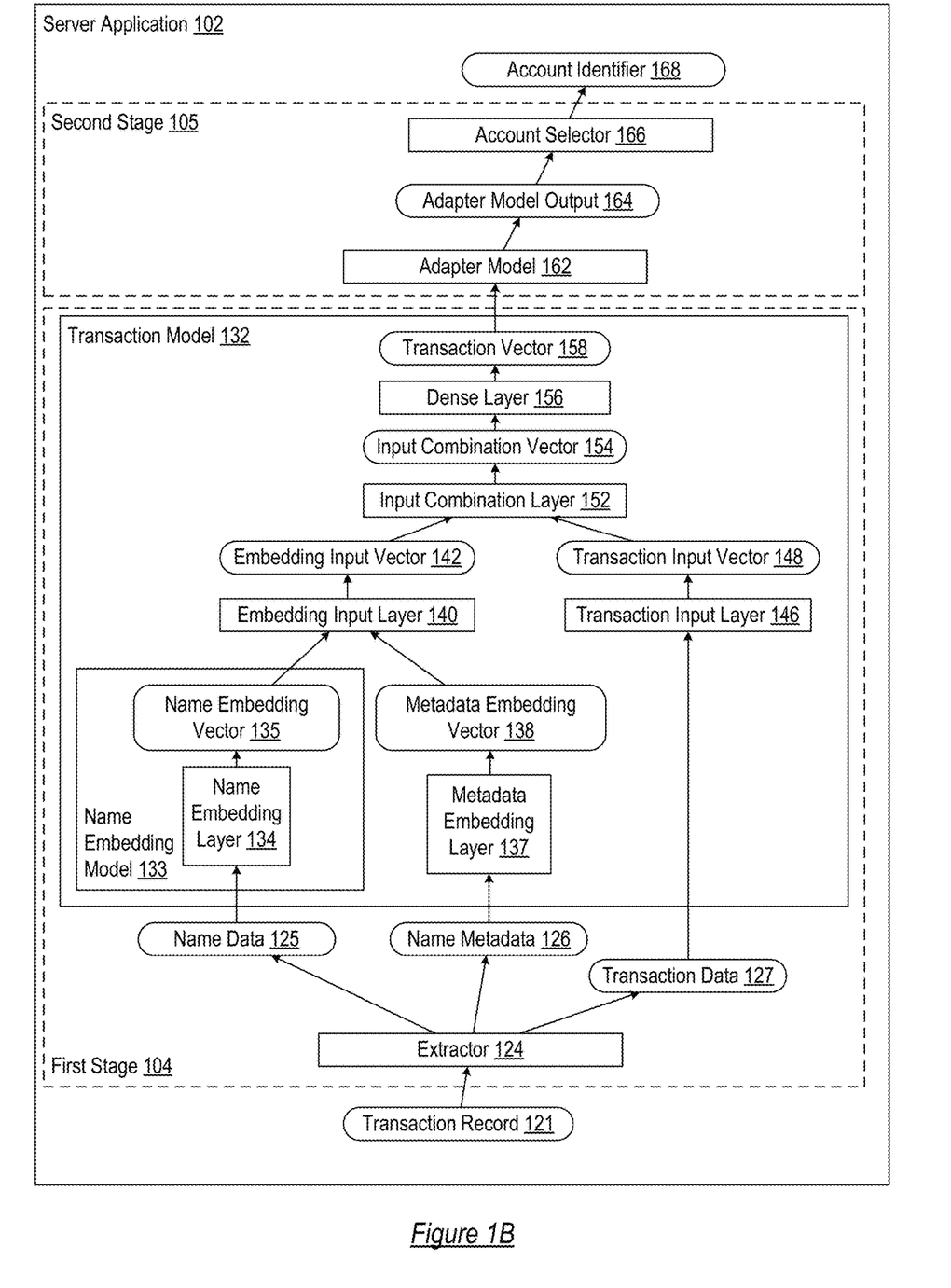
Figure 1C:
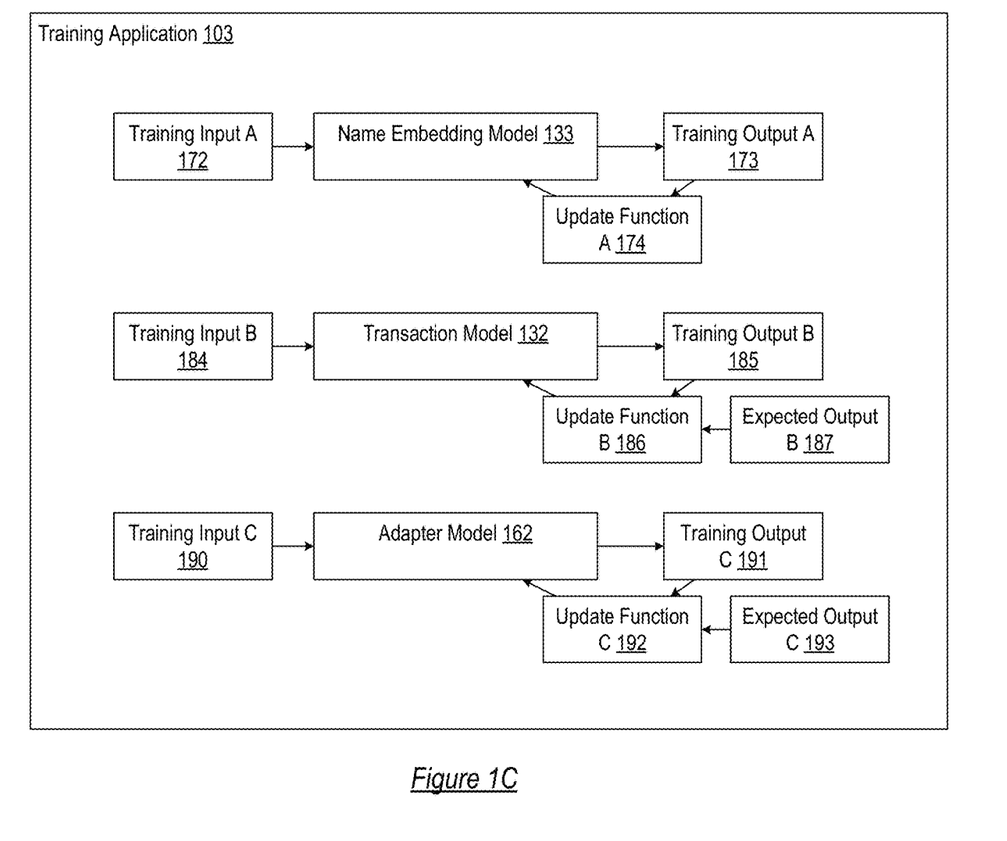

Turning now to the Figures, FIGS. 1A, 1B, and 1C show schematic diagrams in accordance with the disclosure. FIG. 1A shows a diagram of an overall system (100), which trains and uses the two-stage solution to categorize transaction records. FIG. 1B shows a detailed diagram of the two-stage solution in the server application (102), a component of the system (100). FIG. 1C shows the training application (103), which trains two-stage solution in FIG. 1B. The various elements, systems, and components shown in FIGS. 1A, 1B, and 1C may be omitted, repeated, combined, and/or altered as shown from FIGS. 1A, 1B, and 1C. Accordingly, the scope of the present disclosure should not be considered limited to the specific arrangements shown in FIGS. 1A, 1B, and 1C.

Turning to FIG. 1A, the system (100) includes a user device (117), a repository (106), a developer device (115), and the user device (117). The server (101) may include the server application (102), and the training application (103).

Figure 4A:
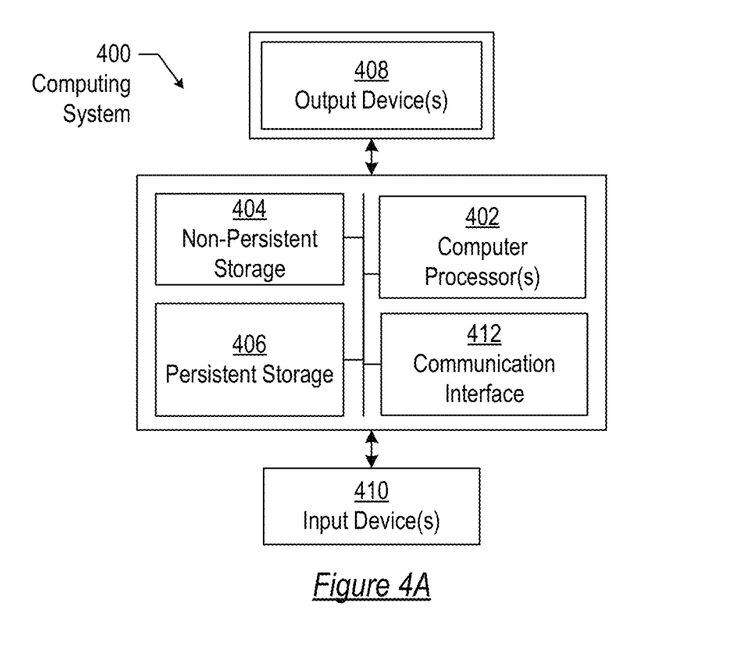
FIG. 4A and FIG. 4B show computing systems in accordance with disclosed embodiments.
Figure 4B:
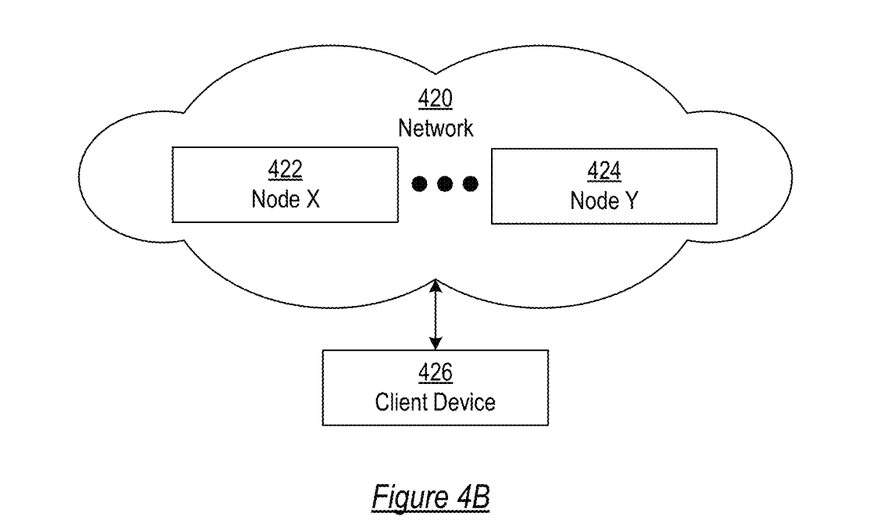

The user device (117) is an embodiment of the computing system (400) and the nodes (422 and 424) of FIG. 4A and FIG. 4B. In one embodiment, the user device (117) is a desktop personal computer (PC), a smartphone, a tablet, etc. that is used by a user. The user device (117) is used to access the web page (111) of the website hosted by the system (100). The user device (117) includes the user application (118) for accessing the server application (102). The user application (118) may be a browser, a local user level application, or another application. The user application (118) may include multiple interfaces (e.g., graphical user interfaces, application program interfaces (APIs)) for interacting with the server application (102). A user may operate the user application (118) to perform tasks with the server application (102) to interact with the system (100). The results may be presented by being displayed by the user device (117) in the user application (118).

The user may be one of multiple users that have access to a computing system on behalf of an entity (e.g., family, business organization, nonprofit organization, etc.). For example, a business may have multiple users that access the system to review the accounts of the entity. An entity may be a person or a business that utilizes the system to track accounts. In the present disclosure, the user may refer to any user operating on behalf of the entity. For example, a first user may customize the chart of accounts for the entity and the second user may review the accounts/process transactions for the entity. In such scenario, the user accounts are the entity's accounts on which the user is performing actions. Each user may have user device (117) to access the server application (102).

The developer device (115) is an embodiment of the computing system (400) and the nodes (422 and 424) of FIG. 4A and FIG. 4B. In one embodiment, the developer device (115) is a desktop personal computer (PC). The developer device (115) includes the developer application (116) for accessing the training application (103). The developer application (116) may include a graphical user interface for interacting with the training application (103) to control training and updating the machine learning models of the system (100).

The developer application (116) and the user application (118) may be web browsers that access the server application (102) and the training application (103) using web pages hosted by the server (101). The developer application (116) and the user application (118) may additionally be web services that communicate with the server application (102) and the training application (103) using representational state transfer application programming interfaces (RESTful APIs). Although FIG. 1A shows a client server architecture, one or more parts of the training application (103) and the server application (102) may be local applications on the developer device (115) and the user device (117) without departing from the scope of the disclosure.

The repository (106) is any type of storage mechanism or device that includes functionality to store data. The repository may include one or more hardware devices (e.g., storage servers, file systems, database servers, etc.) computing system that may include multiple computing devices in accordance with the computing system (400) and the nodes (422 and 424) described below in FIGS. 4A and 4B. The repository (106) may be hosted by a cloud services provider (e.g., that provides hosting, virtualization, and data storage services as well as other cloud services to operate and control the data, programs, and applications that store and retrieve data from the repository (106)). The data in the repository (106) may include the transaction data (107), the account data (108), the machine learning model data (109), and the training data (110).

The transaction data (107) is data for multiple transactions of multiple entities of the system (100). In one or more embodiments, a transaction is a financial transaction between the entity and at least one other party to the transaction. For example, the financial transaction may be between a customer of the entity and the entity. As another example, the transaction may be between a vendor of the entity and the entity. The transaction may be a commercial transaction involving the sale of one or more products (e.g., goods and/or services).

Transactions are stored as transaction records. A transaction record includes data describing a transaction. A transaction record is a text string describing a financial transaction. In one embodiment, a transaction record is for a commercial transaction and includes a name of an opposing party to the transaction, an amount of the transaction, a date of the transaction (which may include a time), and a description of the transaction. The opposing party to the transaction (i.e., opposing party) is at least one other party with which the entity performs the transaction. As such, the opposing party may be the payor or payee depending on whether the transaction is an income (i.e., involves payment to the entity) or an expense (i.e., involves the entity making payment). The description may include the name of the opposing party.

The account data (108) is data for the accounts of the multiple entities that use the system (100). An account may be a bookkeeping account that tracks credits and debits for a corresponding entity. Each entity may have a chart of accounts. The term, chart of accounts, corresponds to the standard definition used in the art to refer to the financial accounts in the general ledger of an entity. The chart of accounts is a listing of accounts that are used by the entity. Different accounts may have different tax implications and accounting implications.

For at least some entities, the chart of accounts is customized. Namely, one or more of the accounts in the chart of accounts may have different names and/or types of transactions than used by other entities. The entity may generate a new name for the account and/or define, directly or indirectly, the particular types of transactions for the account. Each account has a corresponding unique account identifier. An account identifier is a value that uniquely identifies one of a number of accounts.

In the repository (106), the account data (108) may include the charts of accounts for the entities and the account identifiers that identify the different accounts for an entity. Additionally, each account may have a precomputed account vector mapped to the account, which identifies the account. As an example, the names of the accounts may include "Reimbursable Expenses", "Advertising and Marketing", "Utilities", "Sales", "Accounts Payable", "Accounts Receivable", "Mortgages", "Loans", "Property, Plant, and Equipment (PP&E)", "Common Stock", "Services, "Wages and Payroll", etc. Each transaction may be assigned to one or more of the accounts in order to categorize the transactions. Assignment of an account to a transaction may be performed by linking an account identifier of an account to a transaction record of a transaction.

Continuing with the repository, the machine learning model data (109) may include the code and data that form the machine learning models used by the system. For example, the weights of the neural network and regression models may be part of the machine learning model data (109).

The training data (110) is the data used to train the machine learning models of the system (100). The training data (110) has pairs of transaction records (e.g., historical transaction records of the entities using the system) and account identifiers that had been assigned to the transaction. The training data (110) may also include the intermediate data generated to train and update the machine learning models of the system. The training data (110) may include the training inputs and expected outputs shown in FIG. 1C.

The data in the repository (106) may also include a web page (111) that is part of a website hosted by the system (100). The users and the developers may interact with the website using the user device (117) and the developer device (115) to access the server application (102) and the training application (103).

Continuing with FIG. 1A, a server (101) is operatively connected to the developer device (115), user device (117), and repository (106). The server (101) is a computing system and/or nodes, such as the computing system and nodes show in FIGS. 4A and 4B. Although shown as individual components, the server (101) and repository (106) may be the same device or collection of devices. The server (101) includes functionality to execute a server application (102).

The server application (102) is a program on the server (101). The server application (102) includes multiple programs used by the system (100) to interact with the user device (117) and present data to a user of the user device (117). Because the chart of accounts is customized, the server application (102) includes a first stage (104) and a second stage (105) of processing for each transaction record to categorize the transaction record into the chart of accounts. The first stage is a general stage that takes a transaction record and generates a transaction vector. Namely, the first stage is general in that the underlying machine learning model (i.e., transaction model (112)) may be trained using transaction data from multiple entities. The second stage (105) is a customized stage of processing in that the second stage adapts the first stage to the particular entity's customized chart of accounts. Thus, the second stage includes an adapter model (113).

The two-stage method addresses the problem of insufficient training samples by having the transaction model convert the sparse raw features (e.g., tens of thousands or even hundreds of thousands of text features from the transaction records) to dense features (e.g., 100-200 features) in a transaction vector. Sparse raw features are features that have mostly zero values and correspond to raw data. An example of sparse raw features is all of the different names of possible businesses with which an entity may perform a transaction (e.g., the names of all of the businesses in the world or in a particular country). Dense features are features are features that are mostly non-zero. For example, a dense feature may be types of the businesses (e.g., home improvement business, construction business, etc.). The transaction vector with dense features may then be used as input to the second stage (105) with the adapter model (113) that is trained for the particular entity's chart of accounts. Further discussion of the first stage (104) and the second stage (105) is presented below.

The first stage (104) includes a transaction model (112). The transaction model (112) is a machine learning model that encodes the raw features from a record of a transaction with a pre-trained encoder. For the first stage, a number of different pre-trained encoders may be used. For example, the transaction model may be a word2vec model. Alternative models include GloVe developed by Stanford, fastText developed by Facebook, Inc., amongst other encoding models. In one embodiment, an extractor extracts raw features from a transaction record. The raw features extracted from the transaction record may include names of opposing parties, standard industry classification (SIC) codes, dates, payment amounts, etc. The raw data is processed by the transaction model to convert the raw data into vectors, which are then combined to form a transaction vector as an output of the first stage. The conversion and combination may be performed using neural network models and algorithms.

The second stage (105) includes an adapter model (113). Various types of models and algorithms may be used as the adapter model (113), including logistic regression, support vector machines, gradient boosting, neural networks, etc. The adaptor model (113) identifies an account, from a chart of accounts, to recommend to a user for categorizing a transaction. The input to the second stage (105) is the transaction vector from the first stage (104) and the output is an identifier for the account recommended for categorizing the transaction.

In one embodiment, the adapter model (113) may be implemented as multiple logistic regression models. Each logistic regression model may be in a one to one correspondence with the accounts in the customized chart of accounts. Each of the logistic regression models receives the transaction vector from the first stage as an input and outputs a value. The output value from one of the logistic regression models (a first logistic regression model) identifies whether the transaction record (from which the transaction vector was generated) should be categorized with the corresponding account that corresponds to the logistic regression model. Further detail regarding the adapter model as multiple logistic regression models is presented below in reference to FIG. 1B.

As another example, the adapter model (113) may be a neural network that receives the transaction vector from the first stage and outputs a vector. The elements of the output vector may correspond to the accounts of the customized chart of accounts and identify the account to which the transaction should be categorized.

The machine learning models (e.g., transaction model (112), adapter model (113)) of embodiments of the disclosure may use neural networks. Neural networks may operate using forward propagation and backpropagation. Forward propagation may include multiplying inputs to a layer of a neural network by a set of weights and summing the result to generate an output. Backpropagation is the backward propagation of error through the layers of a neural network to update the weights of the layers. The weights may be updated in response to error signals generated from the outputs of the layer. Each of the layers of the machine learning models may include multiple layers and form part of a neural network. The layers of the neural networks may include one or more fully connected layers, convolutional neural network (CNN) layers, recurrent neural network (RNN) layers, etc. Machine learning models other than neural networks may also be used in embodiments of the disclosure.

The training application (103) is a program on the server (101). The training application (103) trains the transaction model (112), adapter model (113) as further described in FIG. 1C. The training application (103) may be operated or controlled by the developer device (115) with a developer application (116).

Figure 2A:
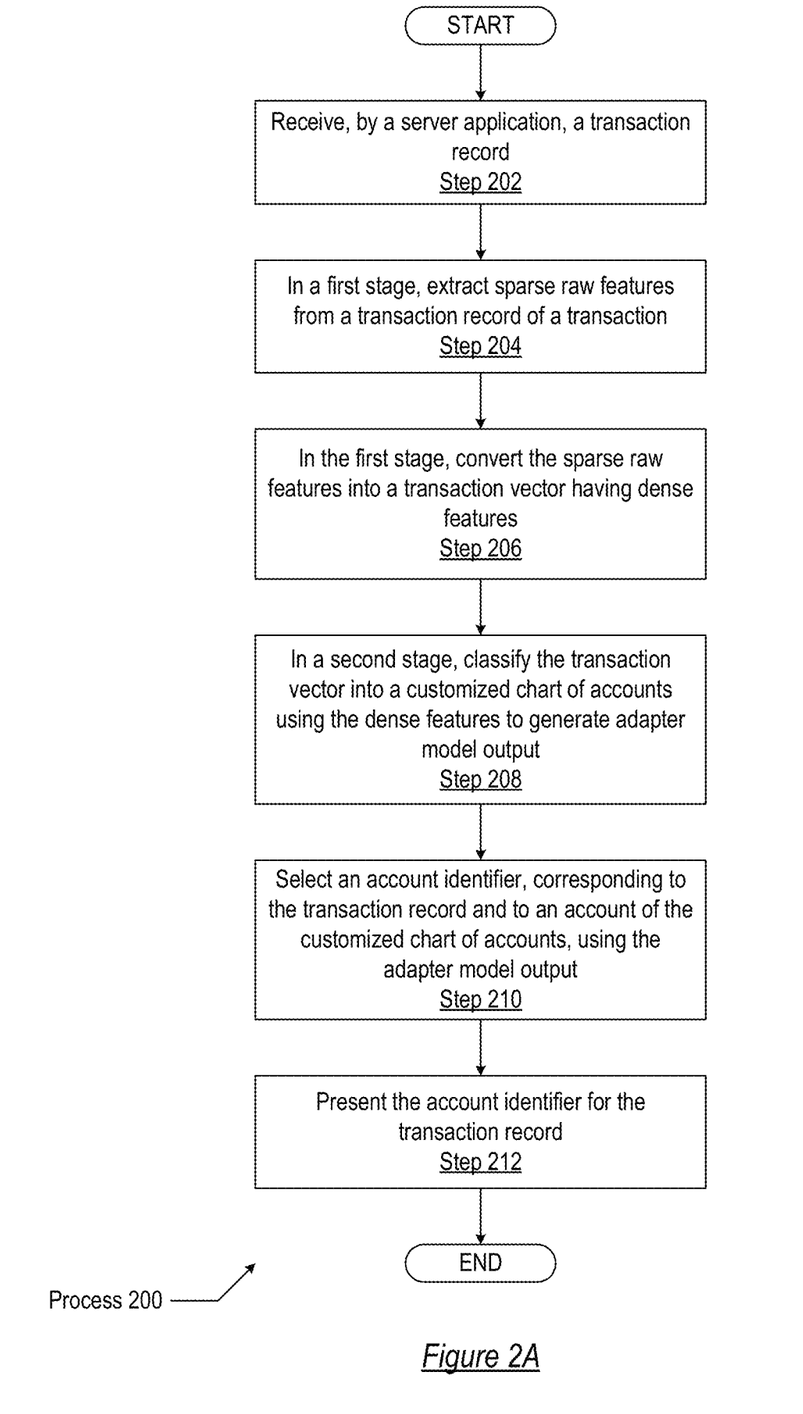
FIG. 2A, FIG. 2B, and FIG. 2C show flowcharts in accordance with disclosed embodiments.

FIG. 2A shows a flowchart of a general process for categorizing transactions using the two-stage solution. While the various steps in the flowchart are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2A, the process (200) may execute on a server to categorize transactions using personalized machine learning models. At Step 202, a transaction record is received. The transaction record may be received by a server application in response to a request from a user device to display the transaction. For example, a browser of a user device sends a request to a website to retrieve and display the transaction, which may be part of a list of transactions. The server application receives the request and then sends the transaction record, which corresponds to the request, to the machine learning model to identify a suggested account identifier for an account to be matched with the transaction described by the transaction record.

At Step 204, sparse raw features are extracted from the transaction record. In one or more embodiments, transaction record is parsed, and the name data, name metadata, and transaction data are individually identified from the transaction record. The parts of the name data, name metadata, and transaction data are the sparse raw features. For example, the opposing party name as a whole may be considered one feature, which the individual words and tuples in the opposing party name may be considered separate features. Some of the features are derived features when extracted. For example, payment amount may be mapped to one of multiple ranges of payment amounts whereby the range mapped to is a feature. By way of a more specific example, individual ranges may exist for $0 to $50, $50 to $150, $150 to $600, $600 to $1500, $1500 to $10000, etc. In the example, each range corresponds to a feature value, such that an individual value (e.g., $106.97) is mapped to the feature value corresponding to the range.

At Step 206, the sparse raw features are converted into a transaction vector having dense features. The transaction vector is generated from the transaction record with a transaction model. The generation of the transaction vector is the first stage. The transaction model is one of the machine learning models used by the system. In one embodiment, the transaction model receives name data, name metadata, and transaction data extracted from the transaction record and uses a multilayer neural network to generate the transaction vector from the name data, name metadata, and transaction data. The transaction vector is passed to the adapter model as the second stage.

At Step 208, in a second stage, the transaction vector is classified into a customized chart of accounts using the dense features to generate adapter model output. The adapter model output is generated from the transaction vector using an adapter model customized to a plurality of accounts. The adapter model includes a machine learning model with the adapter model output mapped to the plurality of accounts. In one embodiment, the adapter model includes multiple logistic regression models that are each applied to the transaction vector to generate the adapter model output. In one embodiment, the adapter model includes a neural network that generates the adapter model output from the transaction vector using forward propagation.

At Step 210, an account identifier, corresponding to the transaction record and to an account of the plurality of accounts, is selected by the server application using the adapter model output. The adapter model output may include multiple values from which a value is selected using a criterion. The criterion may be to select the value having the highest value. Each of the values of the adapter model output is mapped to an account and the account for the highest value is identified from the mapping. The account identifier linked to the account of the highest value is then selected.

At Step 212, an account identifier for the transaction record is presented. In one embodiment, the account identifier may be converted from a unique numerical value to a text string that identifies the account linked to the account identifier. The text string may be incorporated into web data (extensible markup language (XML) text, hypertext markup language (HTML) text, JavaScript object notation (JSON) text, etc.) that is transmitted to a user device after the system received a request for the transaction record.

FIG. 1B shows a detailed diagram of the server application (102) including the two stages in accordance with one or more embodiments of the disclosure. The server application may include additional components not shown in FIG. 1B. In FIG. 1B, oval shapes correspond to data and box shapes correspond to processing components.

Starting at the bottom of FIG. 1B, the extractor (124) extracts data from the transaction record (121). In one embodiment, the extractor (124) extracts the name data (125), the name metadata (126), and the transaction data (127) from the transaction record (121). The name data (125), name metadata (126), and the transaction data (127) are input to the transaction model (132) and are described below.

The name data (125) may be an identifier or name of a business that is a string. In one embodiment, the name data (125) is an opposing party name from the transaction record (121).

The name metadata (126) may be a categorical identifier of the entity identified by the name from the name data. In one embodiment, the name metadata (126) is a standard industrial classification (SIC) code linked to the opposing party identified by the name data (125).

The transaction data (127) includes data from the transaction record (121) that is not part of the name data (125) and the name metadata (126). In one embodiment, the transaction data (127) includes the date (and time) of the transaction, the amount of the transaction, etc., and may be normalized by the extractor (124) for input to the transaction model (132).

The transaction model (132) generates the transaction vector (158) from the name data (125), the name metadata (126), and the transaction data (127). The transaction vector (158) may be a dense vector of tens to hundreds of dimensions (e.g., 128 dimensions). The transaction model (132) is a series of layers for converting data extracted from the transaction record (121) into vectors with using forward propagation. For each layer, the inputs to the layer are multiplied by a set of weights and the results are summed to generate the output of the layer. The output of one layer may be passed as the input to a subsequent layer.

The transaction model (132) includes the name embedding model (133) (with the name embedding layer (134)), the metadata embedding layer (137), the embedding input layer (140), the transaction input layer (146), the input combination layer (152), and the dense layer (156). Each of these components are presented below.

The name embedding layer (134), of the name embedding model (133), generates the name embedding vector (135) from the name data (125). In one embodiment, the name embedding model (133) is a word2vec model that learns word associations from a corpus of text. The name embedding vectors output from the name embedding model (133) may have tens to hundreds of dimensions. When two names (e.g., the names of two different opposing parties) output name embedding vectors with similar values (e.g., a cosine similarity close to 1), then the names (or the entities represented by the names) are similar (even when the letters in the names are different). For example, the name embedding vectors for strings with the values of "Lowes" and "Home Depot" may be similar even though the individual names include different words and characters. "Lowes" may be short for "Lowe's", which is a registered trademark of LF, LLC LIMITED LIABILITY COMPANY DELAWARE 1000 Lowe's Boulevard Mooresville NORTH CAROLINA 28117. "Home Depot" may be short for "The Home Depot" which is a registered trademark of Homer TLC, Inc. CORPORATION DELAWARE 2455 PACES FERRY ROAD ATLANTA GEORGIA 30339.

The metadata embedding layer (137) generates the metadata embedding vector (138) from the name metadata (126). The metadata embedding layer (137) may be a neural network that is an encoder that includes one or more layers of fully connected nodes to generate the metadata embedding vector (138) that is output by the metadata embedding layer (137).

The embedding input layer (140) generates the embedding input vector (142) from the name embedding vector (135) and the metadata embedding vector (138). In one embodiment, the embedding input layer (140) is a neural network that includes one or more fully connected layers to generate the embedding input vector (142) as an output.

The transaction input layer (146) generates the transaction input vector (148) from the transaction data (127). In one embodiment, the transaction input layer (146) may be a neural network that includes one or more fully connected layers to generate a transaction input vector as the output.

The input combination layer (152) generates input combination vector (154) from the embedding input vector (142) and the transaction input vector (148). In one embodiment, the input combination layer (152) is a neural network that includes one or more fully connected layers to generate the input combination vector (154) as the output of the input combination layer (152).

The dense layer (156) generates the transaction vector (158) from the input combination vector (154). In one embodiment, the dense layer (156) is a neural network that includes one or more fully connected layers to generate the transaction vector (158). The transaction vector (158) is passed from the first stage (104) to the second stage (105) with the adapter model (162).

The adapter model (162) generates the adapter model output (164) from the transaction vector (158). The raw data (e.g., the transaction record (121), the name data (125), the name metadata (126), and the transaction data (127), etc.) may be too sparse and have too few examples to properly train the machine learning models that make up the adapter model (162). The adapter model (162) is a machine learning model and may use decision trees, gradient boosted trees, support vector machines, neural networks, logistic regression, etc.

In one embodiment, the adapter model (162) may include multiple logistic regression models that are mapped to the accounts of a chart of accounts for an entity utilizing the system. Each entity has a corresponding customized set of logistic regression models. The logistic regression models may be mapped to the accounts, and correspondingly account identifiers, in a one to one correspondence. Thus, in the customized set, an individual logistic regression model may exist for each account of an entity. The logistic regression models generate logistic regression model outputs based on the transaction vector. Each logistic regression model output is a classification of whether the transaction record (121) is to be linked to the corresponding account that maps to the logistic regression model that generated the output. For a particular account, the logistic regression model operates as standard but using features in the transaction vector as the features of the model. Namely, features are weighted by corresponding weights and then mathematically combined to generate the logistic regression model output, whereby the weights are learned through the training of the model. In one or more embodiments, the logistic regression model output is a value between 0 and 1 whereby the lower the value, the less likely that the transaction matches the corresponding account. The adapter model output (164) may include each of the logistic regression model outputs and be formed as a vector.

In one embodiment, the adapter model (162) may be a neural network. The neural network may include customized layers and outputs that are specific to the chart of accounts of an individual entity. Each entity may have a customized neural network.

The account selector (166) selects the account identifier (168) from a plurality of account identifiers using the adapter model output (164). In one embodiment, each adapter model output (164) is a vector that includes an element for each of the multiple accounts of a chart of accounts in a one to one correspondence. An element is a value in the vector.

The account selector (166) may use a criterion to select the account identifier (168) using the adapter model output (164). For example, the criterion may be to select the element in adapter model output (164) with the optimal value. The optimal value may be the highest value. The selector may further be configured to use the mapping between the elements of adapter model output (164) and the accounts to identify the account linked to the account identifier (168) of the account.

As shown in FIG. 1B, the name embedding model (133) and the metadata embedding layer (137) function to generate an encoding of the name data (125) and the name metadata (126). The remaining transaction data (127) is encoded by the transaction input layer (146). Thus, the name embedding model (133), the metadata embedding layer (137), and the transaction input layer (146) operate on different parts of the transaction record (121) to generate a the transaction vector (158) that encodes the transaction record (121). The adapter model (162) is specific to the chart of accounts and functions to relate the transaction vector (158) to the chart of accounts. The account selector (166) performs a final classification of the transaction record (121).

Figure 2B:
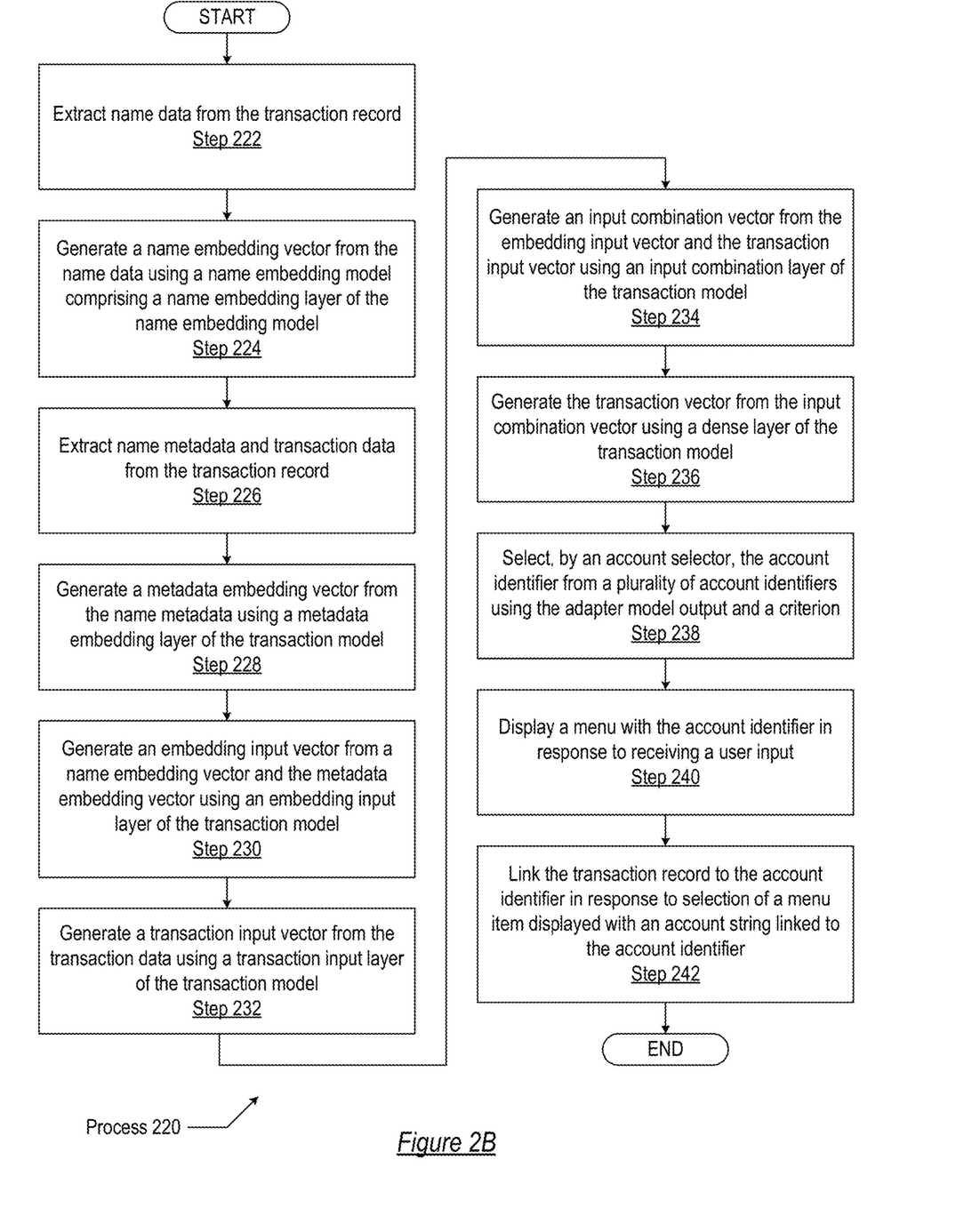

FIG. 2B shows a detailed diagram of the processing by the server application in accordance with one or more embodiments. Turning to FIG. 2B, the process (220) may execute on a server to categorize transactions using personalized machine learning models. At Step 222, name data is extracted from the transaction record. The name data may be a string extracted from a field of the transaction record. In one embodiment, the field is an opposing party name field that identifies the opposing party the transaction described by the transaction record. In one embodiment, the field may be a description field and the name data may be a subset of the description field it is matched against a list of opposing party names.

At Step 224, a name embedding vector is generated from the name data using a name embedding model. The name embedding model includes a name embedding layer of the transaction model. The name embedding model may be incorporated as part of the transaction model during execution of the transaction model. In one embodiment, the name data is passed through the name embedding layer of the name embedding model using forward propagation to generate the name embedding vector.

At Step 226, name metadata and transaction data are extracted from the transaction record. The name metadata may be extracted by extracting an opposing party name from the transaction record, looking up a standard industrial classification (SIC) code for the opposing party name from a database mapping opposing party names to SIC codes, and converting the code to a sparse vector. The transaction data may include the date and amount of the transaction from the transaction record, which may be normalized and may be passed in as elements of a vector to the transaction model.

At Step 228, a metadata embedding vector is generated from the name metadata using a metadata embedding layer of the transaction model. The metadata embedding vector may be a dense vector generated from the sparse vector that is the name metadata. In one embodiment, the name metadata is passed through the metadata embedding layer using forward propagation to generate the metadata embedding vector.

At Step 230, an embedding input vector is generated from a name embedding vector and the metadata embedding vector using an embedding input layer of the transaction model. In one embodiment, the name embedding vector and the metadata embedding vector are passed through the embedding input layer using forward propagation to generate the embedding input vector.

At Step 232, a transaction input vector is generated from the transaction data using a transaction input layer of the transaction model. In one embodiment, the transaction data is passed through the transaction input layer using forward propagation to generate the transaction input vector.

At Step 234, an input combination vector is generated from the embedding input vector and the transaction input vector using an input combination layer of the transaction model. In one embodiment, the embedding input vector and the transaction input vector are passed through the input combination layer to generate the input combination vector.

At Step 236, the transaction vector is generated from the input combination vector using a dense layer of the transaction model. In one embodiment, the input combination vector is passed through the dense layer using forward propagation to generate the transaction vector.

At Step 238, the account identifier is selected by an account selector from a plurality of account identifiers using the adapter model output and a criterion. In one embodiment, the criterion is having the highest value of a set of values, which are mapped to the plurality of accounts, in the adapter model output. For example, the adapter model output may include a vector with each element mapped to one account of a chart of accounts. The element in the vector with the highest value may be selected and the account identifier determined based on the mapping between the elements and the accounts. In one or more embodiments, the adapter model output is further compared against an assignment threshold. The account identifier is selected if the assignment threshold is satisfied. In some embodiments, an account identifier is selected only if the assignment threshold is satisfied.

At Step 240, a menu is displayed with the account identifier in response to receiving a user input. In one embodiment, the menu is a right click menu that is displayed in response to the browser receiving a right click event for a transaction in a list of transactions displayed with the browser.

At Step 242, the transaction record is linked to the account identifier in response to selection of a menu item displayed with an account string linked to the account identifier. For example, after a right click menu is displayed, one of the menu items may be selected that identifies the account to which the transaction, corresponding to the displayed transaction record, is to be linked.

Figure 2C:
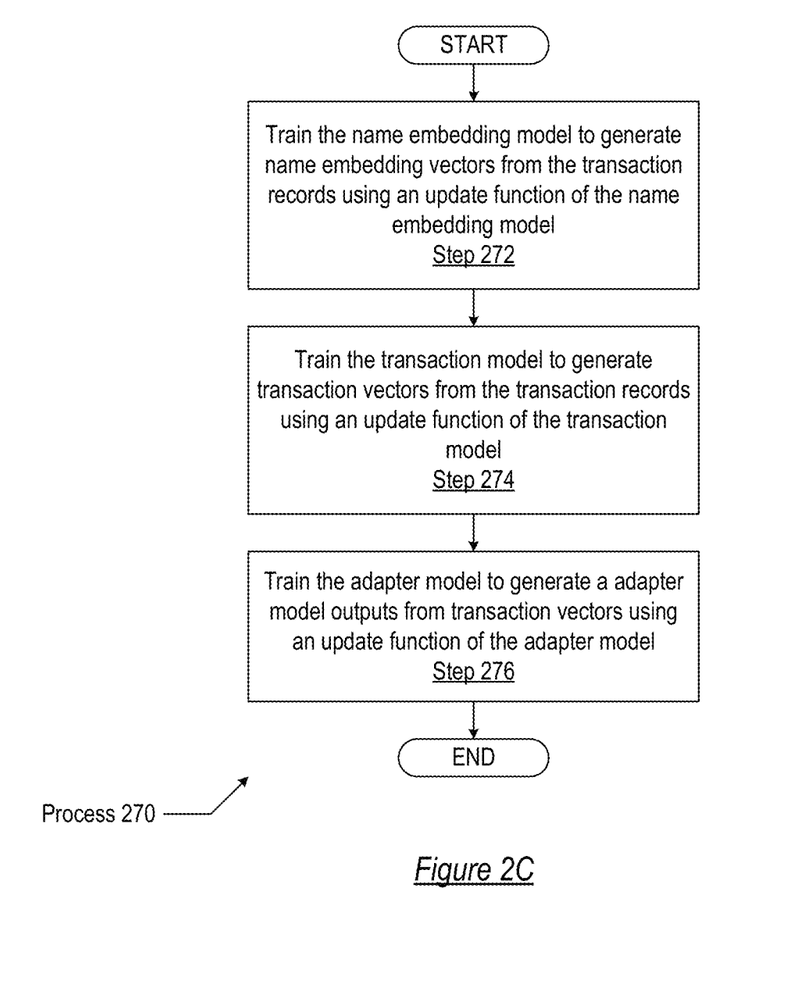

The various machine learning models are trained. FIG. 1C shows a schematic diagram for training the machine learning models and FIG. 2C shows a flowchart for performing the training using the components of FIG. 1C. Turning to FIG. 1C, the training application (103) trains the machine learning models used by the system (100) (of FIG. 1A). In one embodiment, the machine learning models used by the system (100) (of FIG. 1A) are neural networks that take training inputs, generate training outputs from the training inputs, use an update function to compare the training output to an expected output, and update the machine learning models in accordance with the errors between the training outputs and the expected outputs. Each of the machine learning models (including the name embedding model (133), the transaction model (132), and the adapter model (162)) of the system (100) (of FIG. 1A) may be trained independently. The steps for performing the training are described in FIG. 2C.

Continuing with FIG. 1C, the training input A (172) to the name embedding model (133) is the co-occurrence of name data items from multiple user accounts. The name embedding model (133) using the training input A (172) to generate training output A (173). An update function A (174) is configured to update the parameters of the name embedding model (133). For example, the update function may be a loss function. Further discussion of the training of the name embedding model is presented in relation to Step 272 of FIG. 2C.

The transaction model (132) generates the training output B (185) from the training input B (184). In one embodiment, the training input B (184) are raw features (name data, name metadata, and transaction data) extracted from a transaction record and the training output B (185) are transaction vectors that are generated with the transaction model (132) as detailed above in the description of FIG. 1B. The update function B (186) compares the training output B (185) to the expected output B (187) and iteratively updates the transaction model (132), which may be done using backpropagation.

The adapter model (162) generates the training output C (191) from the training input C (190). In one embodiment, the training input C (190) are transaction vectors and the training output C (191) are account identifiers that are generated with the adapter model (162) as detailed above in the description of FIG. 1B.

FIG. 2C provides a flow diagram for performing the training of the model. Turning to FIG. 2C, the process (270) may execute on a server to train machine learning models that categorize transactions. At Step 272, the name embedding model is trained to generate name embedding vectors from the transaction records. The name embedding model may be trained independently of the other machine learning models of the system. Training of the name embedding model is described as follows. The name embedding model is an embedding dictionary mapping words in the name data to a fixed dimensional vector space based on the training input, which contains the co-occurrence of name data items from multiple user accounts. The update function adjusts the embedding vector space so that names co-occurring in an account are embedded in close by locations, and names that do not co-occur together are embedded in locations far away from each other. An iterative backpropagation process is used to minimize the objective function.

In one embodiment, the name embedding model is trained using a modified word2vec algorithm. Instead of learning word associations using sentences, the training application for the name embedding model creates "sentences" from groups of opposing party names from transactions that have been assigned to the same account identifier. For example, the training input may include a pair of transaction records associated with the same account, with the transactions being with "Lowes" and "Home Depot" respectively. The training data for the name embedding model may include name data for transactions from multiple entities for which the system is used. In one embodiment, the name embedding model may be trained as part of the transaction model and may be trained independently from the transaction model.

At Step 274, a transaction model is trained to generate transaction vectors from the transaction records using an update function of the transaction model. The inputs for training the transaction model include training data extracted from transaction records and the expected outputs include account vectors mapped to the transaction records. During training, the weights of the layers of the transaction model may be updated using backpropagation. In one embodiment, a name embedding model, within the transaction model, may be trained as part of the transaction model. In one embodiment, the training input to the transaction model may be name metadata that is used for training purposes and is extracted from a transaction record. The expected output may be a transaction vector that was assigned to an account of a chart of generic accounts. The chart of generic accounts may be the default accounts for entities of the system prior to creating a customized chart of accounts. In one embodiment, training the transaction model does not update the weights of the name embedding model (i.e., the weights of the name embedding layer of FIG. 1B), which forms a part of the transaction model.

At Step 276, training the adapter model to generate adapter model outputs from transaction vectors using an update function of the adapter model. The adapter model may be trained separately from or in conjunction with the transaction model. Inputs to the adapter model during training may include transaction vectors generated from transaction records in the training data. In one embodiment, the outputs of the adapter model are a vector that is compared to an expected output vector from the training data. The error between the output in the expected output is fed back to the adapter model to update the weights of the adapter model. The update function iteratively updates the adapter model.

Figure 3:
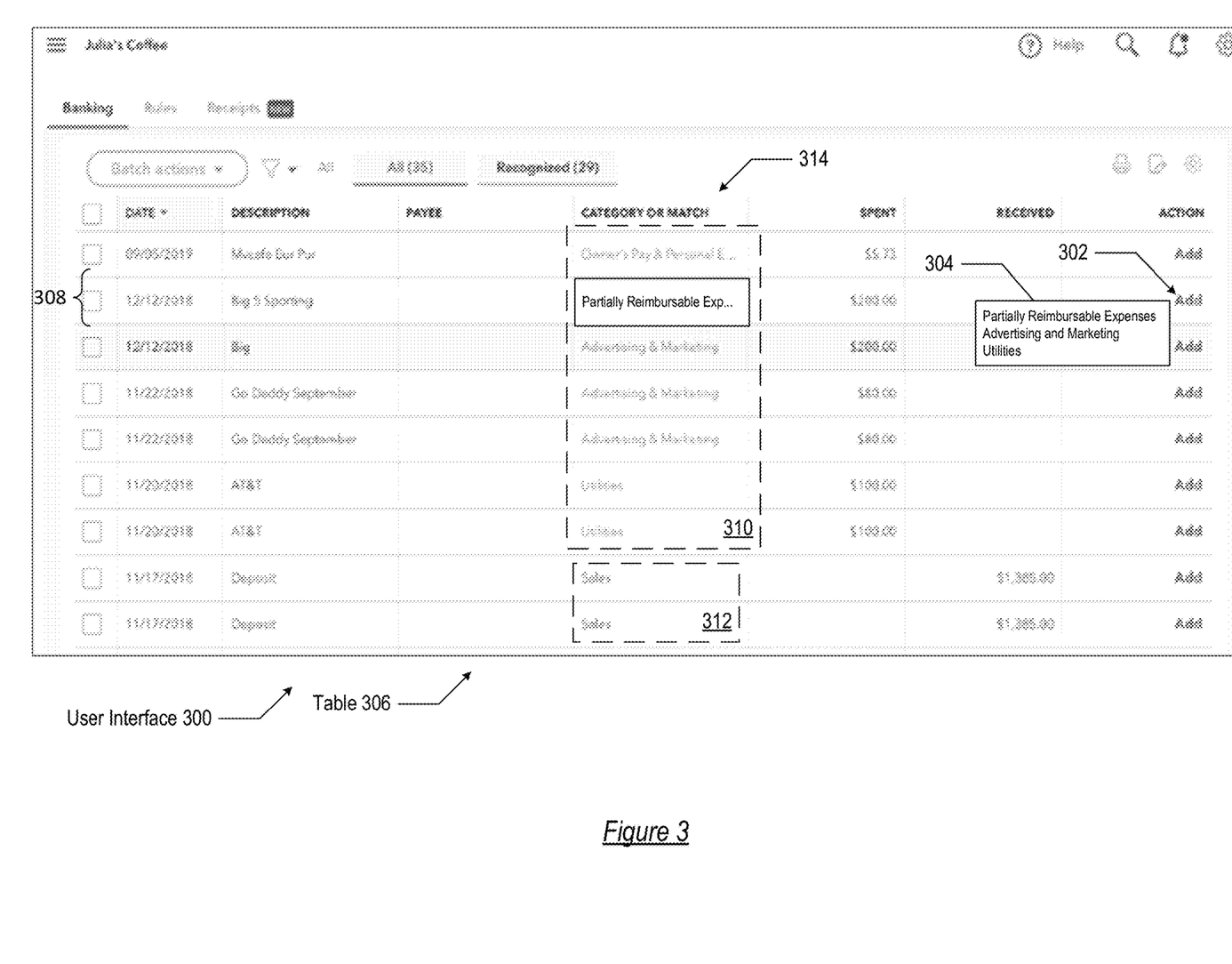
FIG. 3 shows an example in accordance with disclosed embodiments.

FIG. 3 shows an example of a user interface for a system that categorizes transaction records using personalized machine learning models. The embodiments shown in FIG. 3 may be combined and may include or be included within the features and embodiments described in the other figures of the application. The features and elements of FIG. 3 are, individually and as a combination, improvements to the technology of computing systems and machine learning systems. The various features, elements, widgets, components, and interfaces shown in FIG. 3 may be omitted, repeated, combined, and/or altered as shown. Accordingly, the scope of the present disclosure should not be considered limited to the specific arrangements shown in FIG. 3.

Turning to FIG. 3, the user interface (300) may be displayed on a client device of a user for an entity with a customized chart of accounts. The user interface (300) includes multiple user interface elements (referred to as elements) that allow for action with the transaction records stored by the system. In one embodiment, the user interface (300) is a browser displaying a webpage. With the user interface (300), a user may inspect or select the accounts assigned to the transaction records displayed within the table (306). Each of the machine learning models used by the system may be trained prior to use in conjunction with display of the user interface (300).

The user interface (300) displays a list of transaction records in the table (306). The table (306) includes the row (308). The transaction records are displayed in several rows and columns with a row for each transaction record and columns for different types of data within a transaction record. In the example of FIG. 3, the opposing party name of a transaction record is part of the description field of the transaction record and has not been extracted to an opposing party field of the transaction record.

The column (314) displays account data from a category field of a transaction record. The account data displayed in the column (314) includes text strings that describe the accounts that may be linked to the transaction records displayed in the table (306).

For a particular transaction, an assignment threshold is applied to adapter model output to determine whether the transaction should be assigned the account. The assignment threshold may be a scalar value to which a value from the adapter model output is compared. When the value from the adapter model output exceeds the assignment threshold, the account may be automatically linked to the transaction record. When the value does not exceed the assignment threshold, the account may be provided as a recommendation to the user. The account data displayed within portion (310) of the column (314) are for accounts that have not been automatically matched to transaction records where the adapter model output for the account identifier of the displayed account does not reach an assignment threshold. Account data displayed within the portion (312) of the column (314) are for accounts that have been automatically matched and linked to transaction records by adaptor model outputs that met the assignment threshold.

By way of an example of operations described herein, consider the scenario in which transaction record in row (308) is not yet associated with an account. To identify the items in the menu (304), the transaction record of the row (308) is input to a machine learning model to generate the account identifiers found in the menu (304). For example, the transaction record of the row (308) may correspond to the transaction record (121) (of FIG. 1B) from which the name data, the name metadata, and the transaction data are extracted using the extractor.

The name data (e.g., "Big 5 Sporting") is input to the name embedding layer, which generates the name embedding vector. The name metadata (e.g., the SIC code assigned to business "Big 5 Sporting", not shown) is input to the metadata embedding layer, which generates the metadata embedding vector. The name embedding vector and the metadata embedding vector are input to the embedding input layer, which generates the embedding input vector. The transaction data (e.g., 12/12/2018, $200.00), from the extractor, is input to the transaction input layer, which generates the transaction input vector. The embedding input vector and the transaction input vector are input to the input combination layer, which generates the input combination vector. The input combination vector is input to the dense layer, which generates the transaction vector. The transaction vector is input to the adapter model, which generates the adapter model output. The adapter model output is input to the account selector.

Based on the adapter model output, the account selector selects the identifier for the account (e.g., having account name "Partially Reimbursable Expenses") to recommend as the best match to the transaction record of the row (308).

Within the interface, upon selection of the element (302) of the row (308), the above process is performed and the menu (304) is displayed. The menu (304) includes three options for accounts that may be assigned to the transaction record of the row (308). The three options are "Partially Reimbursable Expenses," "Advertising and Marketing," and "Utilities." Each of the options in the menu (304) are linked to accounts that may be possible matches for the transaction of the row (308). For example, the account "Partially Reimbursable Expenses" is a custom account in a customized chart of accounts for an entity. Selection of one of the text strings (e.g., "Partially Reimbursable Expenses") from the menu (304) assigns the account linked to the text string to the transaction of the row (308).

The items in the menu (304) are sorted by the account selector in order of increasing similarity to the transaction record of the row (308). The account linked to the text string "Partially Reimbursable Expenses" is indicated (by placement at the top of the menu (304)) as being the account with the highest recommendation. Specifically, the highest recommendation is determined from the adapter model output, generated from a transaction vector, and the account associated with the highest valued element from the adapter model output receives the topmost position in the menu (304).

In the above example, each of the accounts in the menu (304) may be a customized account that is specific to the entity. Because of the sheer number of possible businesses with which the entity may perform transactions (e.g., all of the businesses in the World or in a Country), the entity's own transactions are insufficient to categorize into custom accounts. However, by using the two-stage model, automated categorization and recommendations into different custom accounts is achievable as described above.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities that implement the features and elements of the disclosure.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g., join, full join, count, average, etc.), sorts (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
extracting, by a transaction machine learning model at a first stage comprising a number of pre-trained encoders, a plurality of sparse raw features from a transaction record of a transaction, wherein the transaction machine learning model is a general model trained on transaction data from a plurality of entities to convert sparse features to dense features, wherein the transaction record is for a particular entity;
encoding, by the number of pre-trained encoders in the first stage, the plurality of sparse raw features into a transaction vector comprising a plurality of dense features;
classifying, by an adapter model at a second stage that is a machine learning model trained, for the particular entity, on historical transactions in a customized chart of accounts of the particular entity, the transaction vector into the customized chart of accounts using the plurality of dense features to generate adapter model output;
processing the adapter model output to select an account identifier that corresponds to the transaction record and to an account of the customized chart of accounts; and
presenting the account identifier for the transaction record.

2. The method of claim 1, wherein generating the transaction vector further comprises:
extracting name data from the transaction record; and
generating a name embedding vector from the name data using a Word2Vec model.

3. The method of claim 1, wherein generating the transaction vector further comprises:
extracting name metadata and transaction data from the transaction record;
generating a metadata embedding vector from the name metadata;
generating an embedding input vector from a name embedding vector and the metadata embedding vector;
generating a transaction input vector from the transaction data;
generating an input combination vector from the embedding input vector and the transaction input vector; and
generating the transaction vector from the input combination vector.

4. The method of claim 1, wherein selecting the account identifier further comprises:
executing a plurality of logistic regression models on the transaction vector to generate a plurality of logistic regression model outputs, each of the plurality of logistic regression models corresponding to an account in the customized chart of accounts,
selecting the account identifier based on the plurality of logistic regression model outputs.

5. The method of claim 4, further comprising:
selecting, as an adapter model output, a logistic regression model output from the plurality of logistic regression model outputs;
comparing the adapter model output to an assignment threshold; and
selecting the account identifier based on the adapter model output satisfying the assignment threshold.

6. The method of claim 4, further comprises:
training the plurality of logistic regression models using historical transactions in the customized chart of accounts.

7. The method of claim 1, wherein presenting the account identifier further comprises:
displaying a menu with the account identifier in response to receiving a user input.

8. The method of claim 1, further comprising:
linking the transaction record to the account identifier in response to selection of a menu item displayed with an account string linked to the account identifier.

9. The method of claim 1, wherein:
the adapter model comprises a plurality of regression models,
each account in the customized chart of accounts is related to a distinct corresponding regression model of the plurality of regression models, and
wherein generating the adapter model output comprises for each of at least two accounts in the customized chart of accounts:
executing the distinct corresponding regression model for the account using the transaction vector as input to obtain a value classifying whether the transaction record is linked to the account.

10. The method of claim 9, wherein processing the adapter model output comprises selecting, from each of the at least two accounts, the account identifier according to the value generated for each of the at least two accounts.

* * * * *